Dec. 1, 1964    D. E. COLVILL ETAL    3,159,763
BRUSH RIGGING
Filed March 7, 1960    2 Sheets-Sheet 2
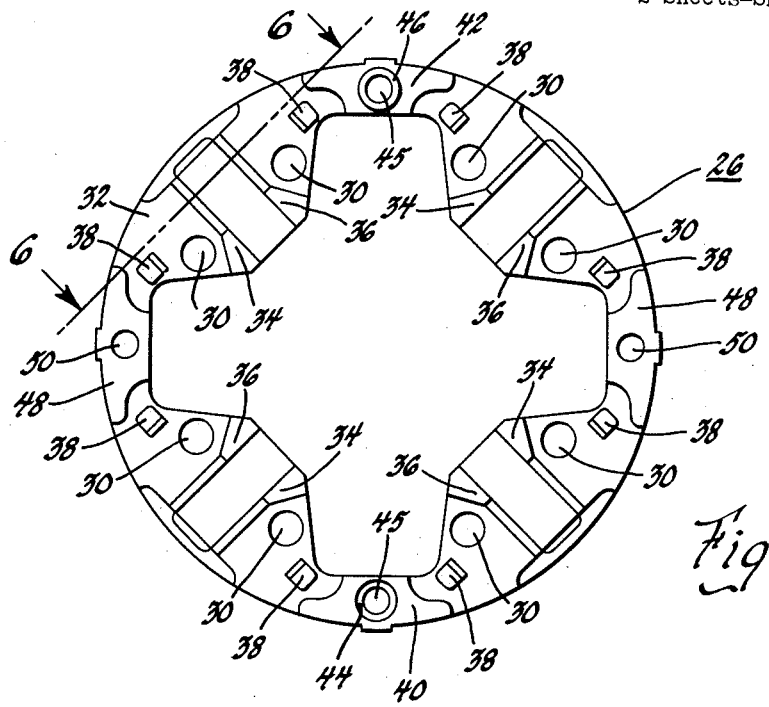
Fig. 5
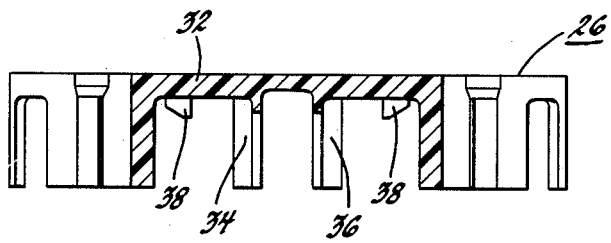
Fig. 6
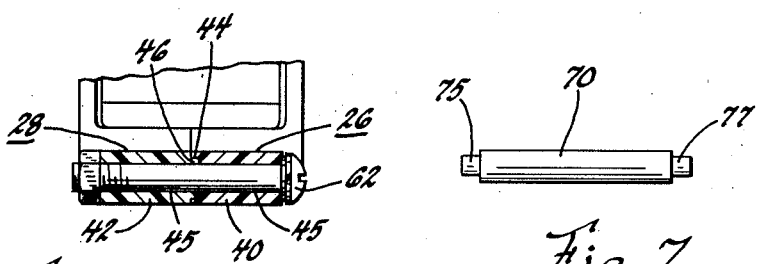
Fig. 4
Fig. 7
INVENTORS
Donald E. Colvill
BY Robert P. Reddy
C.R. Meland
THEIR ATTORNEY

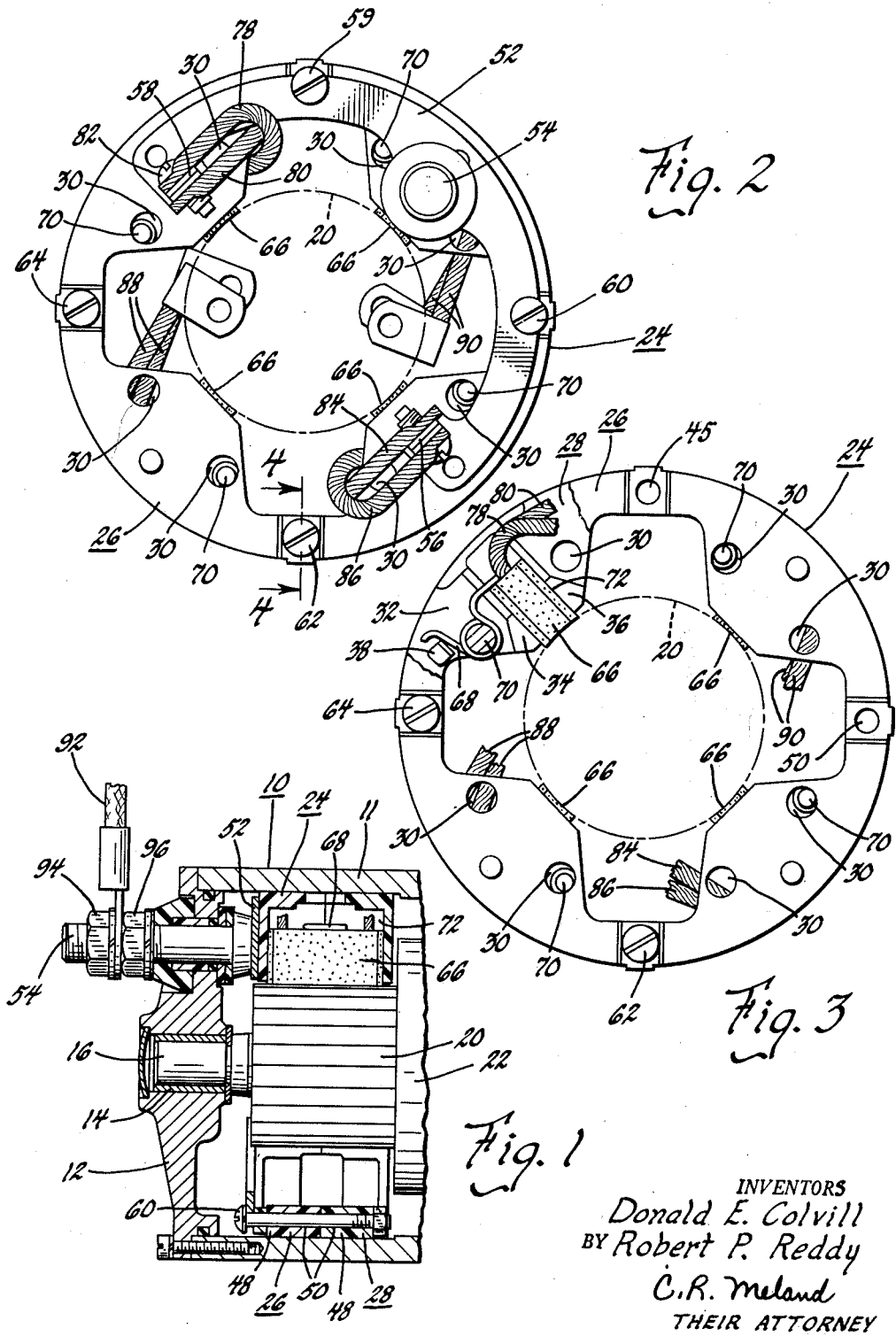

United States Patent Office 3,159,763
Patented Dec. 1, 1964

3,159,763
BRUSH RIGGING
Donald E. Colvill and Robert P. Reddy, Anderson, Ind., assignors to General Motors Corporation, Detroit, Mich., a corporation of Delaware
Filed Mar. 7, 1960, Ser. No. 13,134
7 Claims. (Cl. 310—238)

This invention relates to brush rigging for dynamoelectric machines such as the starting motor for cranking an internal combustion engine.

One of the objects of this invention is to provide a brushholder that includes a pair of identically formed insulator members that are secured together and which have complementary wall portions that provide chambers for receiving brushes.

Another object of this invention is to provide a brush holding arrangement wherein the brushholder assembly carries a terminal plate member having a stud that serves as a terminal which passes through the frame of the dynamoelectric machine and which also serves to prevent axial movement of the brush holding assembly relative to the dynamoelectric machine when the brush holding assembly is in place within the dynamoelectric machine.

Still another object of this invention is to provide a brush holding assembly that includes a pair of identical insulator members held together by fastener means and having complementary wall portions forming chambers for receiving brushes, and further wherein a plurality of pins are supported by the insulator members which carry springs, the springs having one end engaging a brush and the other end engaging projections which are integral with the insulator members.

Further objects and advantages of the present invention will be apparent from the following description, reference being had to the accompanying drawings wherein a preferred embodiment of the present invention is clearly shown.

In the drawings:

FIGURE 1 is a sectional view of a portion of a dynamoelectric machine illustrating the brush holding arrangement of this invention.

FIGURE 2 is a plan view of a brush holding assembly made in accordance with this invention showing the position of the terminal plate.

FIGURE 3 is a plan view with parts broken away of a brush holding assembly made in accordance with this invention and with the terminal plate removed.

FIGURE 4 is a sectional view taken along line 4—4 of FIGURE 2.

FIGURE 5 is a plan view of one of the insulator members that forms a part of the brush holding assembly of this invention.

FIGURE 6 is a sectional view taken along line 6—6 of FIGURE 5.

FIGURE 7 is a plan view of the pins that form a part of the brushholder of this invention.

Referring now to the drawings and more particularly to FIGURE 1, the reference numeral 10 generally designates a dynamoelectric machine which may be, for example, a starting motor for cranking an internal combustion engine. The dynamoelectric machine has a tubular frame 11 and a bearing 14. The bearing 14 supports one end of an armature shaft 16 carrying a commutator 20 and an armature winding 22. The dynamoelectric machine may be assumed to be conventional and forms no part of the present invention.

The brush holding arrangement of this invention is shown in place in FIGURE 1 and is generally designated by reference numeral 24. The brush holding assembly 24 includes a pair of insulator members 26 and 28 which are of identical configuration. The insulator member 26 will be described in detail but it is to be understood that the insulator member 28 has the same configuration.

The insulator member 26 is better illustrated in the plan view of FIGURE 5 and in the sectional view of FIGURE 6. It is seen that the insulator member 26 is provided with a plurality of holes 30, the purpose of which will be more fully described hereinafter. The insulator member 26 has an end wall 32 from which extends the walls 34 and 36. A plurality of projections 38 extend from the wall 32, as is clearly apparent from FIGURES 5 and 6. The insulator members 26 and 28 have portions 40 and 42, the portion 40 having a recessed portion 44 and the portion 42 having a projecting portion 46. These portions are also formed with holes 45 as is clearly apparent from FIGURE 5. The insulators also have portions 48 which are formed with holes 50.

When it is desired to assemble the brush holding assembly of this invention, the insulator members are fitted together so that a projecting portion 46 will fit within a complementary recessed portion 44 on the other insulator member. The portions 48 of the two insulator members abut each other so that the holes 50 and 45 in respective insulator members line up with each other.

A terminal plate member designated by reference numeral 52, which is generally arcuately shaped, is then positioned on the insulator member 26. It is to be noted that this plate member 52 has a stud 54 which has its head portion welded or otherwise secured to the plate member 52. The plate member 52 has upstanding flanges 56 and 58 which serve to support the lead wires for two of the brushes.

The insulator members 26 and 28 and the terminal plate 52 are held together by fasteners 59 and 60 and the insulators are additionally held together by fasteners 62 and 64.

After the insulator members 26 and 28 and the terminal plate member 52 have been secured together by the fasteners, the brush assembly is fitted with brushes 66, springs 68 and pins 70. With the insulator members 26 and 28 assembled, it is apparent that the end faces of the sidewalls 34 and 36 will abut to provide brush holding chambers designated by reference numeral 72. There are four brush holding chambers provided by the construction illustrated in the drawings, the chambers being spaced circumferentially 90° apart. The pins 70 pass through the openings 30 formed in the insulator members 26 and 28. The pins are of smaller diameter than the holes 30 and have reduced sections 75 and 77 at opposite ends thereof forming shoulders which abut the inner faces of insulator members 26 and 28 when the pins are in place. Each pin 70 carries a pair of springs 68 which are separated by a washer, not shown. One end of a spring 68 engages a projecting portion 38, while the opposite end of the spring engages the top end of brush 66 which is slidable in the brush holding chamber 72. It will be appreciated that four pins 70 are required for an entire brushholder assembly and that two springs 68 are supported by each pin 70.

One of the brushes 66 has a pair of lead wires 78 and 80 which are connected with the upstanding flange 58 of terminal plate 52 by a fastener screw 82. In a like manner, the upstanding flange 56 forms a support for lead wires 84 and 86 which are connected with another brush 66 located directly across from the first mentioned brush 66. The remaining two brushes are connected with lead wires 88 and 90 which are connected with terminals, not shown.

It is seen from FIGURE 1 that the terminal stud 54 is threaded and passes through the end frame 12 of the generator and serves as a terminal for a lead wire 92. In the case of an electric starting motor for cranking an engine, the lead wires 88 and 90, which are connected with oppositely disposed brushes, are connected with the field windings of the starting motor. The terminal stud 54 and the lead wire 92 are connected directly with the armature through the commutator 20. The nuts 94 and 96 are threaded onto stud 54, the nut 94 holding the terminal attached to lead wire 92 in place and the nut 96 holding the stud and thus the brush holding assembly in place.

While the embodiment of the present invention, as herein disclosed, constitutes a preferred form, it is to be understood that other forms might be adopted.

What is claimed is as follows:

1. A brush holding assembly comprising, a pair of annular insulating members secured together in face-to-face relationship, said insulator members having axially extending wall portions which abut each other to form radially extending brush holding chambers, brushes slidable in said brush holding chambers, a plurality of pins having ends supported by said insulator members, a coil spring encircling each of said pins having one end thereof engaging a projecting portion of one of said insulator members and having another end engaging a brush for urging said brush in one direction, each coil spring being positioned between said insulator members, and fastener means for holding said insulator members together.

2. A brushholder assembly comprising, first and second identically formed insulator members having complementary axially extending wall portions, an electrically conductive terminal plate member having an electrically conductive terminal stud extending therefrom and having a pair of upturned flanges, fastener means securing said insulator members together and securing said plate member to one of said insulator members, the wall portions of said insulator members forming radially extending brush holding chambers, brushes slidable in said brush holding chambers, resilient means carried by said insulator members for urging said brushes in one direction, and lead wires connected with said brushes and with the upturned flanges of said terminal plate.

3. In combination, a dynamoelectric machine having an end frame, a brush holding assembly in said dynamoelectric machine including a pair of insulator members having complementary wall portions forming radially extending brush holding chambers, brushes in said brush holding chambers, resilient means supported by said insulator members for urging said brushes into engagement with a rotating part of said dynamoelectric machine, a plate member secured to one of said insulator members carrying a terminal stud that passes through the end frame of said machine, conductor means electrically connecting at least one of said brushes with said plate member, and fastener means engaging said stud for holding said stud fixed with respect to said end frame and for preventing said brush holding assembly from moving axially with respect to said end frame.

4. A brush holding assembly comprising, a pair of annular insulator members located in face-to-face relationship and having complementary wall portions forming radially extending brush holding chambers, brushes in said brush holding chambers, a plurality of matching holes formed in said insulator members, a pin having end portions of reduced cross section located in each pair of matching holes, a coil spring supported by each pin having one end thereof engaging a projecting portion of one of said insulator members and having an opposite end thereof engaging a brush to urge said brush in one direction, and fastener means securing said insulator members together.

5. A brush holding assembly comprising, a pair of annular insulator members having complementary axially extending wall portions forming brush holding chambers, a plurality of matching openings formed in said insulator members, a pin having reduced end portions forming shoulders located in a pair of said openings with the shoulders engaging said insulator members, brushes slidable in said brush holding chambers, a coil spring carried by each of said pins having one end thereof engaging a projecting portion of one of said insulator members and having an opposite end thereof engaging a brush for urging said brush in one direction, projecting means on one of said insulator members projecting into a complementary opening in the other of said insulator members, and fastener means for holding said projecting means of one of said insulator members within the opening of other of said insulator members to prevent relative rotation between said insulator members.

6. In combination, a dynamoelectric machine having an end frame, a brush holding assembly in said dynamoelectric machine including an insulator member formed with a brush holding chamber, a brush slidable in said brush holding chamber, resilient means for urging said brush into engagement with a rotating part of said dynamoelectric machine, a plate member formed of electrically conductive material secured to said insulator member and carrying an electrically conductive terminal stud that passes through the end frame of said machine, conductor means electrically connecting said brush with said plate member, and fastener means engaging said stud for holding said stud fixed with respect to said end frame to thereby support said brush holding assembly from said end frame.

7. In combination, a dynamoelectric machine including a tubular frame and an end frame therefor and a brush holding assembly for said dynamoelectric machine, said brush holding assembly comprising: a plurality of insulating members having complementary surfaces with channels formed therein, said insulating members disposed in opposite juxtaposition thereby having the channels forming guide chambers when the insulating members are so disposed; a plurality of brushes slidable in the formed guide chambers; resilient means for urging said brushes into engagement with a rotating part of said dynamoelectric machine; terminal plate means for electrically engaging at least one of said plurality of brushes; a terminal stud passing through the end frame providing a terminal on one side thereof and having a portion conductively engaging said terminal plate means, said terminal plate means holding the oppositely disposed insulating members against a portion of the tubular frame; and fastener means engaging said terminal stud for holding said stud fixed with respect to said end frame to thereby support said brush holding assembly from said end frame.

References Cited in the file of this patent
UNITED STATES PATENTS

| | | |
|---|---|---|
| 2,324,299 | Haifley et al. | July 13, 1943 |
| 2,663,810 | Stein | Dec. 22, 1953 |
| 2,753,477 | Yahn et al. | July 3, 1956 |
| 2,760,094 | Edmundson | Aug. 21, 1956 |
| 2,798,979 | Ernst | July 9, 1957 |

UNITED STATES PATENT OFFICE
CERTIFICATE OF CORRECTION

Patent No. 3,159,763                            December 1, 1964

Charles D. Flanagan

It is hereby certified that error appears in the above numbered patent requiring correction and that the said Letters Patent should read as corrected below.

Column 3, line 55 and 56, for "construction" read -- constructions --; lines 67 and 68, for "circuit, connected across" read -- circuit, said electrical load being parallel-connected across --.

Signed and sealed this 20th day of April 1965.

(SEAL)
Attest:

ERNEST W. SWIDER
Attesting Officer

EDWARD J. BRENNER
Commissioner of Patents